(12) United States Patent
Chung et al.

(10) Patent No.: US 8,724,531 B2
(45) Date of Patent: May 13, 2014

(54) LOW POWER MODULE FOR A STATION OF A WIRELESS COMMUNICATION SYSTEM AND RELATED METHOD

(75) Inventors: Ching An Chung, Miaoli County (TW); Shih-Chung Yin, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 191 days.

(21) Appl. No.: 12/820,403

(22) Filed: Jun. 22, 2010

(65) Prior Publication Data
US 2010/0304780 A1    Dec. 2, 2010

Related U.S. Application Data

(62) Division of application No. 11/241,743, filed on Sep. 30, 2005, now abandoned.

(51) Int. Cl.
*G08C 17/00*    (2006.01)

(52) U.S. Cl.
USPC ............ 370/311; 455/522; 455/572; 455/574

(58) Field of Classification Search
USPC ........ 455/572, 574; 713/300, 320; 340/539.3, 340/693.3, 7.32–7.38; 370/311
See application file for complete search history.

(56) References Cited

U.S. PATENT DOCUMENTS

| | | |
|---|---|---|
| 5,892,772 A | 4/1999 | Hauris et al. |
| 7,274,679 B2 | 9/2007 | Amit et al. |
| 2005/0047356 A1* | 3/2005 | Fujii et al. .................... 370/311 |
| 2005/0078633 A1 | 4/2005 | Watanabe et al. |
| 2005/0122926 A1 | 6/2005 | Cromer et al. |
| 2006/0050729 A1 | 3/2006 | Chen et al. |
| 2006/0094476 A1* | 5/2006 | Guy .............................. 455/574 |
| 2006/0268799 A1 | 11/2006 | Huang et al. |
| 2007/0190964 A1* | 8/2007 | Edwards et al. ........... 455/343.1 |
| 2009/0296618 A1* | 12/2009 | Wang et al. .................... 370/311 |

OTHER PUBLICATIONS

Chen, et al.; "Power Management for VoIP over IEEE 802.11 WLAN;" IEEE 2004.

* cited by examiner

*Primary Examiner* — Lester Kincaid
*Assistant Examiner* — Mehmood B Khan
(74) *Attorney, Agent, or Firm* — McClure, Qualey & Rodack, LLP

(57) ABSTRACT

The invention relates to a low power module, and in particular, to a low power module applied in a station of a wireless communication system. A low power module includes a first MAC module, a second MAC module, a low power switch register, a control register unit, a slow clock generator, and a multiplexer (MUX). The first and second MAC module transmits and receives packets in a normal operational mode and a power save mode, respectively. The low power switch register switches a current mode to another mode. The control register unit controls the RF/BB module and the clock generator under the control of the low power switch register. The slow clock generator generates a slow operational clock for the second MAC module in the power save mode. The MUX chooses the normal operational or the slow operational clock periodically as a clock of the second MAC module according to the control register unit.

17 Claims, 5 Drawing Sheets

LOW POWER MODULE FOR A STATION OF A WIRELESS COMMUNICATION SYSTEM AND RELATED METHOD

CROSS REFERENCE TO RELATED APPLICATIONS

This application is a divisional application of U.S. application Ser. No. 11/241,743, which was filed on Sep. 30, 2005, and is included herein by reference.

BACKGROUND

The invention relates to a low power module, and in particular, to a low power module applied in a station of a wireless communication system.

The widespread use of various wireless devices in network environments has increased the demand for wireless local area networks ("WLANs") to provide high data transfer rates at low cost. However, power consumption of these devices is excessive.

SUMMARY

The invention provides a user station applied in a wireless communication system. The wireless communication system comprises an access point (AP) and a plurality of stations. The plurality of stations and the AP sends packets to communicate with each other. The user station comprises a host module, a low power module, a RF/BB module, and a clock generator. The host module controls operation of the station. The low power module transmits and receives packets with low power consumption. The RF/BB module processes various analog and digital signals from the packets. The clock generator provides a normal operational clock to the station.

The invention further provides a low power module applied in a station. The low power module comprises a first MAC module, a second MAC module, a low power switch register, a control register unit, a slow clock generator, and a multiplexer (MUX). The first MAC module operates in normal operational mode and sleeps in power save mode. The second MAC module controls normal operational mode and power save mode switch and maintains basic connection. The low power switch register switches control sources between first MAC and second MAC. The control register unit controls the RF/BB module and the clock generator under the control of the low power switch register. The slow clock generator generates a slow operational clock for the second MAC module in the power save mode. The MUX chooses the normal operational or the slow operational clock periodically as the clock of the second MAC module according to the control register unit. The second MAC module sends a wake up event to the first MAC module to wake up the first MAC module and switches to the normal operational mode if the second MAC module received a specific packet or a specific beacon in the power save mode or under a waiting timeout condition.

A further object of the invention is to provide a method of controlling a user station applied in a wireless communication system. The method comprises: entering a power save mode; switching periodically between the listen phase and the deep sleep phase wherein the low power unit waits for a wanted beacon or a wanted packet in the listen phase and is idle in the deep sleep phase; synchronizing the low power unit with the AP automatically for optimized power saving when receiving a beacon, and returning to a normal operational mode.

DESCRIPTION OF THE DRAWINGS

The following detailed description, given by way of example and not intended to limit the invention solely to the embodiments described herein, will best be understood in conjunction with the accompanying drawings, in which.

DESCRIPTION

Figure 1:
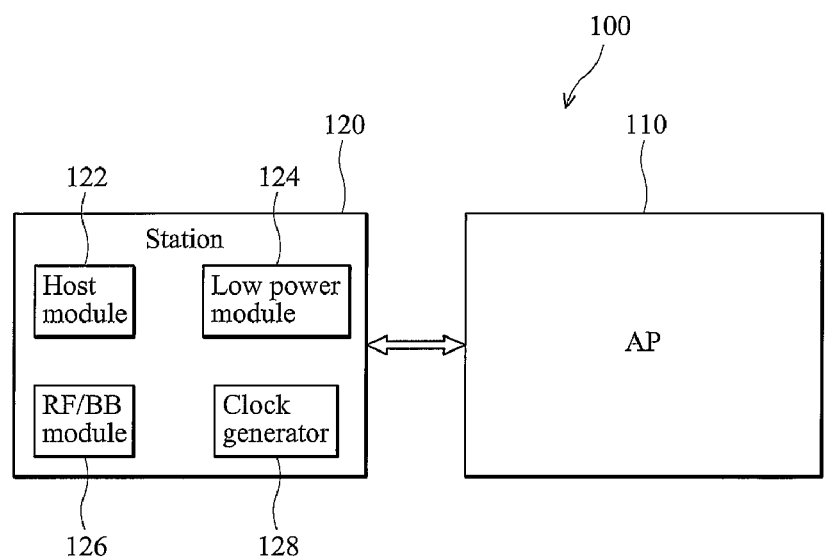
FIG. 1 shows a block diagram of a wireless communication system comprising an access point and a station according to one embodiment of the present invention.
Figure 2:
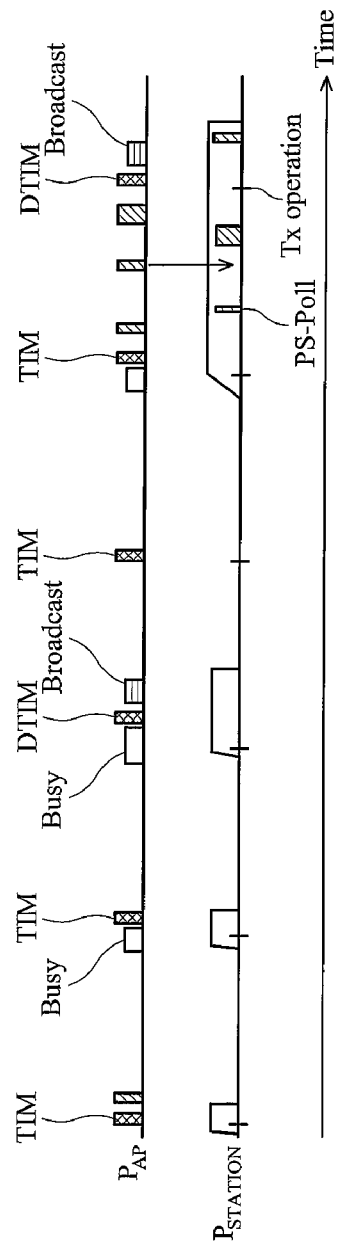
FIG. 2 shows a waveform diagram of a plurality of packets, which is sent from the AP to the station, and a plurality of packets, which is sent from the station to the AP.

A detailed description of the present invention is provided in the following. Please refer to FIG. 1 and FIG. 2 at the same time. FIG. 1 shows a block diagram of a wireless communication system 100 comprising an access point (AP) 110 and a station 120 according to one embodiment of the present invention. FIG. 2 shows a waveform diagram of a plurality of packets $P_{AP}$, which are sent from the AP 110 to the station 120, and a plurality of packets $P_{STATION}$, which are sent from the station 120 to the AP 110. The AP 110 and the station 120 send packets to each other through a medium (e.g. air). There are various kinds of packets, such as unicast packets, broadcast packets, beacon, and PS-Poll. These packets will be described in greater detail later. Because the operation and functionality of the AP 110 is known to those skilled in the art, further discussion is omitted for the sake of brevity. The operation of the station 120 is further detailed in the following.

The station 120 comprises a host module (e.g. host CPU) 122, a low power module (e.g. low power chip) 124, a radio frequency/base band (RF/BB) module (e.g. RF/BB chip) 126, and a clock generator (e.g. PLL, OSC, regulator) 128. There are two modes in the station 120: normal operation mode and power save mode. In the normal operation mode, the operation of the station 120 is similar to that of a conventional station; all the elements in the station 120 wake and consume excessive power. In this mode, the host module 122 controls the station 120 to communicate with the AP 110. In another power save mode, all elements in the station 120 sleep to reduce power consumption except for the low power module 124. In this mode, the low power module 124 controls the station 120 to maintain basic connection with the AP 110. The RF/BB module 126 processes various analog and digital signals from the packets and the clock generator 128 provides a normal clock $CLK_{normal}$ to the station 120. Because the operation and functionality of the RF/BB module 126 and the clock generator 128 is known to those skilled in the art, further discussion is omitted for the sake of brevity. A detailed description of functionality and operation of the low power module 124 is provided in the following.

Figure 3:
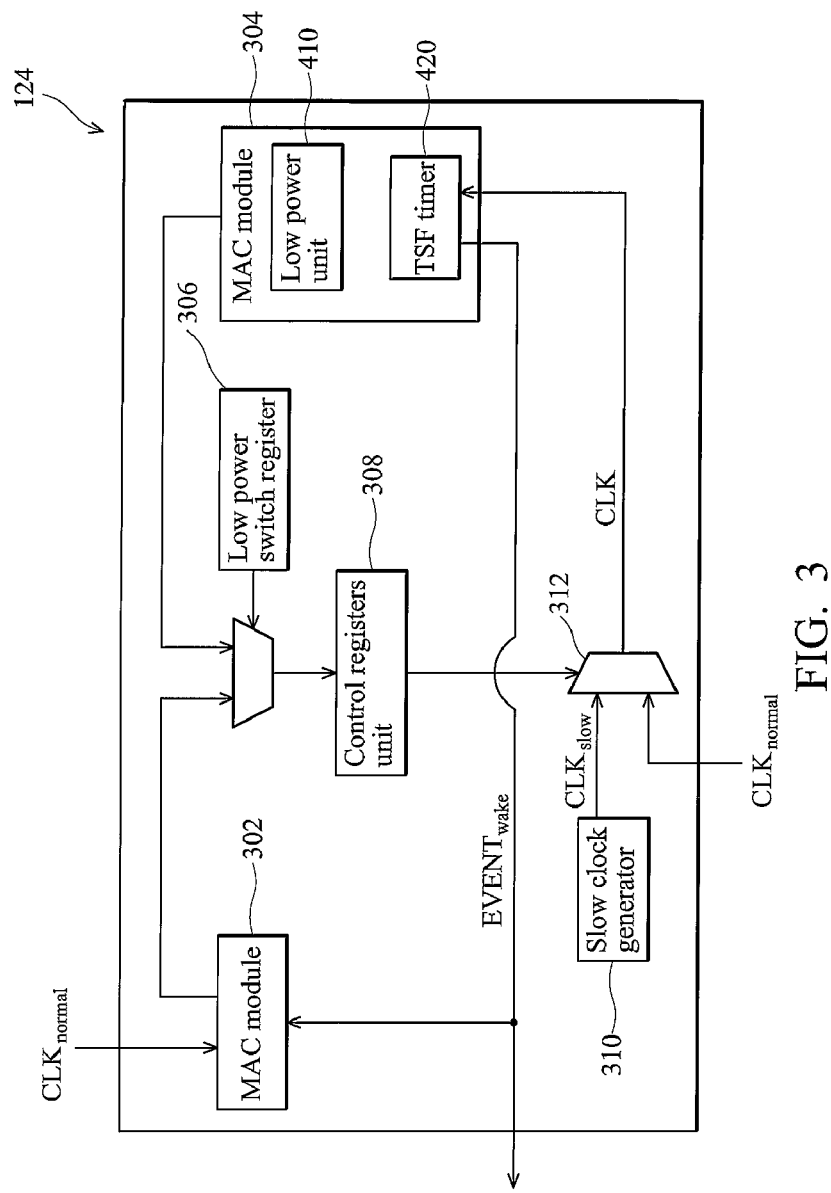
FIG. 3 shows a block diagram of the low power module in FIG. 1.

Please refer to FIG. 3. FIG. 3 shows a block diagram of the low power module 124 in FIG. 1. The low power module 124 comprises two medium access control (MAC) modules 302 and 304, a low power switch register 306, a control registers unit 308, a slow clock generator 310, and a multiplexer (MUX) 312. A detailed description of the MAC module 302 is first provided in the following.

The MAC module 302 under the control of the host module 122 (in FIG. 1) communicates with the AP 110 (in FIG. 1) according to a predetermined wireless communication specification (e.g. IEEE 802.11) in the normal operation mode. In the power save mode, the MAC module 302 sleeps and some of its functionality is replaced by the MAC module 304 (described later). There are various architectures for MAC module 302. For example, if the MAC module 302 has no CPU, the host module 122 will control the RF/BB module 130 directly. Otherwise, if the MAC module 302 is a SOC chip (embedded CPU), the MAC module 302 will control the RF/BB module 130 directly. A detailed description of the MAC module 304 is provided in the following.

The MAC module 304 comprises a low power unit 410 and a timing synchronization function (TSF) timer 420. The low power unit 410 communicates with the AP 110 (in FIG. 1) according to a predetermined wireless communication specification in the power save mode. The TSF timer 420 (e.g. 64-bit timer) calculates a periodical wakeup time $T_{TSF}$ to make the low power unit 410 sleeps and wakes up periodically. In the power save mode, all elements in the station 120 sleep to save power except for the MAC module 304. The low power unit 410 sleeps (deep sleep phase in the power save mode) and wakes up (listen phase in the power save mode) periodically to listen to specific packets (e.g. beacon or wanted packets) from the AP 110 according to the wakeup time $T_{TSF}$ of the TSF timer 420. In the deep sleep phase of power save mode, the low power unit 410 only sleeps. In the listen phase of power save mode, the MAC module 304 wakes to listen to specific packets.

It also maintains basic connection with AP 110 by sending a NULL packet while losing beacon packet several times. If the wanted packet is received or a programmed timeout occurs, the low power unit 410 sends an event $EVENT_{wake}$ to wake up all sleeping elements in the station 120 to leave the power save mode and enter the normal operation mode. Otherwise, other elements in the station 120 stay asleep and the MAC module 304 periodically wakes up. A detailed description of elements 306 and 308 is provided in the following.

The low power switch register 306 is utilized to switch a current mode to another mode. For example, if the station 120 is in the normal operation mode, the low power switch register 306 can change the station 120 from the normal operation mode to the power save mode. Otherwise, if the station 120 is in the power save mode, the low power switch register 306 can change the station 120 from the power save mode to the normal operation mode. The control registers unit 308, which is controlled by the low power switch register 306, is utilized to control various operations of elements (e.g. RF/BB module, PLL, oscillator, regulator) in the station 120. In the normal operation mode, the control registers unit 308 controls various elements (e.g. RF/BB module) to wake and operate normally. In the power save mode, the control registers unit 308 controls various elements (e.g. RF/BB module) to sleep to reduce power consumption and controls the MUX 312 to periodically select one clock as an operational clock CLK from two different clocks. A detailed description of elements 310 and 312 is provided in the following.

The slow clock generator 310 provides a slower clock $CLK_{slow}$ (compared with the normal clock $CLK_{normal}$ from the clock generator 128) to the MAC module 304 to operate. The MUX 312 selects the normal clock $CLK_{normal}$ as the operational clock CLK of the MAC module 304 in the listen phase and selects another slower clock $CLK_{slow}$ as the operational clock CLK of the MAC module 304 in the deep sleep phase.

Figure 4:
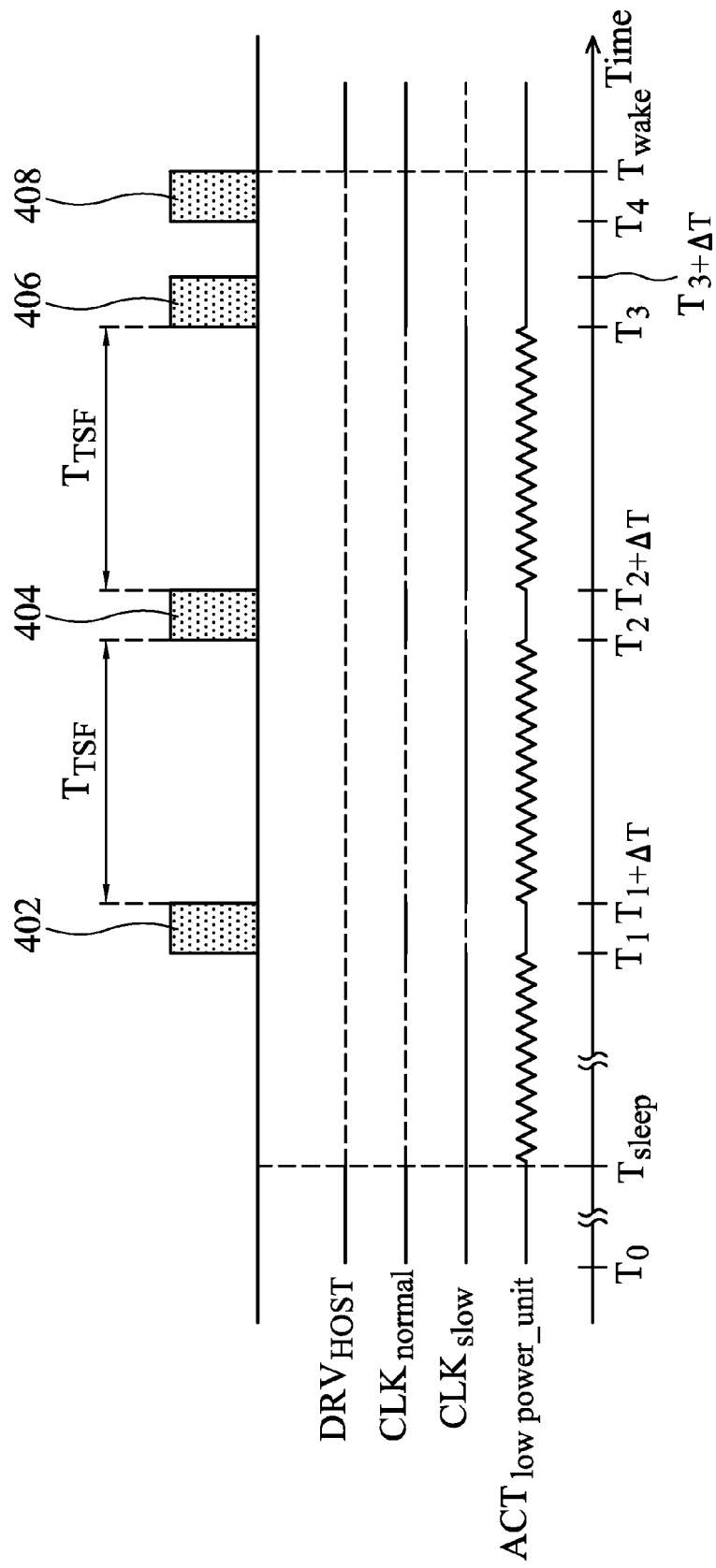
FIG. 4 shows a timing diagram of the host module, a normal clock, a slow clock, and a low power unit operating between operational mode and power save mode.

Please refer to FIG. 4. FIG. 4 shows a timing diagram of a host driver $DRV_{HOST}$ from the host module 122, a normal clock $CLK_{normal}$, a slow clock $CLK_{slow}$, and a low power unit activity $ACT_{low\_power\_unit}$ with a plurality of packets 402~408 received from the AP 110. During time the interval ($T_0$~$T_{sleep}$), the station 120 is in the normal operation mode, all elements in the station wake and operate normally. During the interval ($T_{sleep}$~$T_{wake}$) the station 120 changes from the normal operation mode to the sleep mode. All elements in the station 120 keeps sleeping until time $T_{wake}$, except the MAC module 304, the MUX 312, the control registers unit 308 and the RF/BB module 126 in the durations ($T_1$~$T_{1+\Delta T}$), ($T_2$~$T_{2+\Delta T}$), ($T_3$~$T_{wake}$). In time $T_{wake}$, the station 120 changes from the sleep mode to the operation mode again. All elements in the station 120 will wake again and continue to operate at the time $T_{wake}$. The activity of the communication driver $DRV_{HOST}$ in the host module 122 also stops during the interval ($T_{sleep}$~$T_{wake}$). In the interval ($T_{sleep}$~$T_{wake}$), the low power unit 410 changes phases (deep sleep phase and listen phase) periodically. In the durations ($T_1$~$T_{1+\Delta T}$), ($T_2$~$T_{2+\Delta T}$), ($T_3$~$T_{wake}$), the low power unit 410 is in the listen phase to listen to specific packets, the clock $CLK_{normal}$ is active to provide the operational clock for the low power unit 410, and the clock $CLK_{slow}$ is sleeping. In the durations ($T_{sleep}$~$T_1$), ($T_{1+\Delta T}$~$T_2$), ($T_{2+\Delta T}$~$T_3$), the low power unit 410 is in the deep sleep phase and does nothing but sleeps, the clock $CLK_{normal}$ is sleeping, and the clock $CLK_{slow}$ is active to provide the operational clock for the low power unit 410. During the interval ($T_{sleep}$~$T_{wake}$), the low power unit 410 receives a plurality of specific packets (e.g. beacon) from the AP 110 in the listen phase and does nothing in the deep sleep phase periodically. The period time $T_{TSF}$ of phase transition is counted by the TSF timer 420. When receiving the beacon packets 402 and 404, the low power unit 410 finds no indication in these beacon packets and continues to sleep again to wait next time wakeup. If finding indication of buffered unicast in the beacon packet or buffered broadcast indication with wanted packet following (e.g., ARP) from the AP 110, the low power unit 410 will leave the sleep mode and wake up the whole station 120. If missing beacon packets several times, the low power unit 410 will switch MAC module 304 to send NULL packet and wait for acknowledgement which maintains basic connection.

Figure 5:
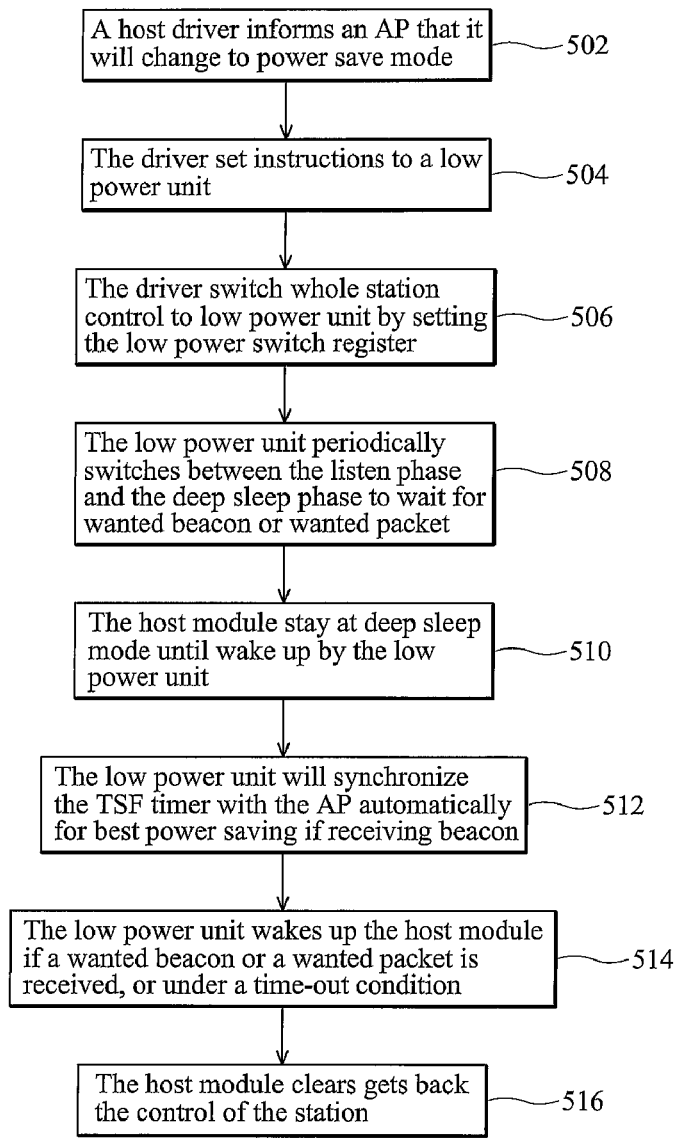
FIG. 5 is a flowchart illustrating a low power method utilized in a wireless communication system according to another embodiment of the invention.

Please refer to FIG. 5, which is a flowchart illustrating a low power method utilized in a wireless communication system according to another embodiment of the invention. A detailed description is given in the following.

Step 502: Station informs an AP that it will change to power save mode.

Step 504: The driver sets instructions (wake-up and operating sequences) to a low power unit which is an instruction based architecture and can be programmed with a different power save level. The instructions include information of waited packet type for waking up a host module, timer for beacon, PLL turning on/off timing, RF/BB control sequences.

Step 506: The driver switches whole station control (except the low power switch register that is fully controlled by the driver) to low power unit by setting the low power switch register. The driver can also get back control by resetting the low power switch register at any time.

Step 508: After getting the station control and entering a power save mode, the low power unit periodically switches between the listen phase and the deep sleep phase. During the power save mode, the low power unit operates independently to wait for wanted beacon or wanted packet (e.g. ARP packet). The pattern of wanted packet can be programmed by the driver.

Step 510: The host module stays asleep until wake up by the low power unit.

Step 512: If receiving beacon in BSS, the low power unit will synchronize the TSF timer with the AP automatically for best power saving.

Step 514: If a wanted beacon or wanted packet is received, or under a time-out, the low power unit keeps this packet and asserts a wake up event to wake up the host module.

Step 516: The host module clears (resets) the low power switch register to get back the control of the station after triggered by the wake up event.

Compared with the related art, the low power module applied in a station according to the invention can save more power. When the station sleeps, the low power module wakes up periodically to listen to wanted packets or beacon. If receiving the wanted packets, the low power module generates an event to wake up the station (host module) again.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of controlling a user station applied in a wireless communication system, said wireless communication system comprises an access point (AP) communicates with the user station, the user station comprises a host module and a low power unit for saving power consumption, the method comprising:
    entering a power save mode comprising a listen phase and a deep sleep phase;
    switching between the listen phase and the deep sleep phase wherein the low power unit listens to a predefined event in the listen phase and idles in the deep sleep phase;
    returning to a normal operation mode when losing a particular packet a plurality of times; and
    transmitting a NULL packet and waiting for acknowledgement to maintain a basic connection with the AP, wherein when the user station is at the normal operation mode, the host module is awakened, when the user station is at the deep sleep phase of the power save mode, the host module sleeps, and when the user station is at the listen phase of the power save mode, the host module sleeps and the low power unit is awakened.

2. The station controlling method according to claim 1, further comprising:
    synchronizing the low power unit with the AP automatically.

3. The station controlling method according to claim 1, wherein the step of entering the power save mode further comprising:
    informing the AP that the user station will enter the power save mode;
    setting the user station by a plurality of instructions wherein the plurality of instructions comprises information of at least one of a waited packet type for waking up a host module, a timer for beacon, a PLL turning on/off timing, and a RF/BB control sequence; and
    switching control of the user station to the low power unit and entering the power save mode.

4. The station controlling method according to claim 1, wherein the step of returning to the normal operation mode further comprising:
    asserting a wake up event to wake up a host module if a wanted event is received; and
    switching control of the user station to the host module and returning to the normal operation mode.

5. The station controlling method according to claim 3, wherein the step of switching the control of the user station further comprises setting a low power switch register of the user station to switch the control of the user station.

6. The station controlling method according to claim 4, wherein a pattern of the wanted event can be programmed by the host module.

7. The station controlling method according to claim 1, wherein the wireless communication specification between the AP and the user station is IEEE 802.11.

8. The station controlling method according to claim 1, wherein the step of switching between the listen phase and the deep sleep phase further comprises:
    transmitting and receiving packets in the listen phase and idling to save power in the deep sleep phase;
    transmitting a NULL packet and waiting for acknowledgement while losing packet a plurality of times for basic connection; and
    counting a predetermined wakeup time to switch between the listen phase and the deep sleep phase.

9. The station controlling method according to claim 1, wherein a low power switch register of the user station can be reset to directly leave the power save mode and return to the normal operation mode.

10. The station controlling method according to claim 1, wherein a normal operational clock is chosen as an operational clock of the low power unit in the listen phase and a slow operational clock is chosen as the operational clock of the low power unit in the deep sleep phase.

11. The station controlling method according to claim 1, wherein the predefined event includes at least one of a wanted beacon and a wanted packet.

12. The station controlling method according to claim 2, wherein the step of synchronizing includes synchronizing the low power unit with the AP automatically when receiving a particular packet.

13. The station controlling method according to claim 1, wherein the user station further comprises a RF/BB module, and the RF/BB module sleeps when the user station is in the power save mode.

14. A method of controlling a user station applied in a wireless communication system, said wireless communication system comprises an access point (AP) communicates with the user station, the user station comprises a host module and a low power unit for saving power consumption, the method comprising:
    entering a power save mode comprising a listen phase and a deep sleep phase, wherein the low power unit receives a first clock signal at the listen phase, a second clock signal at the deep sleep phase, and the second clock signal is slower than the first clock signal;
    switching between the listen phase and the deep sleep phase wherein the low power unit listens to a predefined event in the listen phase and idles in the deep sleep phase;
    returning to a normal operation mode when losing a particular packet a plurality of times; and transmitting a NULL packet and waiting for acknowledgement to maintain a basic connection with the AP;

wherein when the user station is at the normal operation mode, the host module is awakened, when the user station is at the deep sleep phase of the power save mode, the host module sleeps, and when the user station is at the listen phase of the power save mode, the host module sleeps and the low power unit is awakened.

15. The method as claimed in claim 14, wherein the user station transmits the NULL packet via a first MAC module, and when the user station is at the power save mode, the first MAC module sleeps and the user station receives packets via a second MAC module of the low power unit.

16. A method of controlling a user station applied in a wireless communication system, said wireless communication system comprises an access point (AP) communicates with the user station, the user station comprises a host module and a low power unit for saving power consumption, the method comprising:

entering a power save mode comprising a listen phase and a deep sleep phase;

switching between the listen phase and the deep sleep phase wherein the low power unit listens to a predefined event in the listen phase and idles in the deep sleep phase:

wherein when the user station is at a normal operation mode, the host module is awakened, when the user station is at the deep sleep phase of the power save mode, the host module sleeps, and when the user station is at the listen phase of the power save mode, the host module sleeps and the low power unit is awakened.

17. The method as claimed in claim 16, wherein the low power unit receives a first clock signal at the listen phase, a second clock signal at the deep sleep phase, and the second clock signal is slower than the first clock signal.

* * * * *